Patented Aug. 11, 1931

1,818,770

UNITED STATES PATENT OFFICE

WILLIAM F. TULEY, OF NUTLEY, NEW JERSEY, ASSIGNOR TO THE NAUGATUCK CHEMICAL COMPANY, OF NAUGATUCK, CONNECTICUT, A CORPORATION OF CONNECTICUT

PROCESS OF DISPERSING CARBON

No Drawing. Application filed November 9, 1929. Serial No. 406,174.

This invention relates to the art of dispersing carbon in a polar liquid.

Due to the inherent difficulty of wetting finely divided carbon it has been necessary heretofore in the preparation of dispersions to grind the carbon in a ball mill in the presence of water and to employ stabilizing agents such as glue, gelatin, soaps or other colloids.

It is the object of this invention to provide a method of making dispersions of carbon by a chemical process. It is also the object of this invention to provide a method of dispersing carbon which does not involve long grinding or the use of stabilizing colloids. Another object of this invention is the production of finely divided carbon in the form of a paste or dry powder which will be dispersed when added to a polar dispersing medium.

Other objects and advantages of the present invention will appear in the following detailed description.

In practicing this invention, 20 parts of carbon black is made into a paste with 70 parts of water in which one part of sodium sulphite has been dissolved. Preferably this paste is heated for 1 hr. at 100° C. When the paste is added to a quantity of water or alcohol it is dispersed immediately.

The proportion of water to carbon black may be varied without limit except that sufficient water must be provided to wet the carbon. The quantity of sodium sulphite may be varied within wide limits such as from about 1%–10% of sodium sulphite based on the carbon. It is obvious that the strength of sulphite solution may be varied by the addition of more or less water thereby giving the process universal applicability. The carbon employed may be in any finely divided form such as lamp black, bone charcoal, carbon black or any of the various forms of vegetable charcoals. In the place of sodium sulphite, the sulphites of any of the alkali metals or of ammonia may be used or equivalent amounts of alkali and sulphur dioxide may be added to water to form the sulphite in solution.

A dispersible dry powder may be prepared as follows: 10 parts of carbon black may be mixed with 100 parts of water containing 1 part of sodium sulphite. The mixture may be heated at its boiling temperature for 1 hr. The carbon black is then filtered out and may be washed with fresh water, if desired, to remove the excess of sulphite salt. Dispersions may be prepared from the carbon black immediately after filtration or the carbon may be dried in the open air at ordinary temperatures, if desired. Such a dry powder will disperse immediately when added to water or alcohol or other polar liquid medium. In carrying out this process the various kinds of finely divided carbon and the various substitutes for sodium sulphite above mentioned may be employed.

The time and temperature of heating are without limit inasmuch as the action will proceed at ordinary room temperatures over a long period of time. The optimum time and temperature appears to be heating the mixture at the boiling temperature for approximately 15 minutes.

The dispersed carbon produced according to this process may be used in the manufacture of inks, water paints, or may be added to dispersed rubber or to other substances suspended in polar liquids such as water or alcohol.

Having described the invention in detail by way of illustration only, other modifications in the details of the process being obvious to one skilled in the art, the invention is now defined by the following claims.

Having thus described my invention, what I claim and desire to protect by Letters Patent is:

1. In the art of dispersing carbon the steps of: mixing finely divided carbon with a solution of an alkali sulphite in a polar dispersing medium.

2. In the art of dispersing carbon the steps of: mixing finely divided carbon with a solution of sodium sulphite in a polar dispersing medium.

3. In the art of dispersing carbon the steps of: mixing finely divided carbon with any of a group of substances which comprises water, methyl alcohol, ethyl alcohol having any of a group of substances comprising sodium sulphite, potassium sulphite, ammonium sulphite dissolved therein.

4. The method of dispersing carbon which consists in mixing finely divided carbon with a solution of sodium sulphite in water.

5. A dispersible carbon which comprises a dried mixture of finely divided carbon and an alkali sulphite and a polar dispersing medium.

6. A dispersible carbon which comprises a dried mixture of finely divided carbon and an alkali sulphite dissolved in a polar dispersing medium.

7. In the art of dispersing carbon, the steps of mixing finely divided carbon with a solution of an alkali sulphite in a polar dispersing medium, heating to boiling for at least fifteen minutes, and adding an excess of polar dispersing medium.

Signed at Passaic, county of Passaic, State of New Jersey, this 26th day of October, 1929.

WILLIAM F. TULEY.